US012743443B2

(12) United States Patent
Jaiswal et al.

(10) Patent No.: US 12,743,443 B2
(45) Date of Patent: Sep. 22, 2026

(54) MULTI-TENANT SELECTION OF ASYMMETRIC DATA REPLICATION LINKS IN DATA CENTERS

(71) Applicant: International Business Machines Corporation, Armonk, NY (US)

(72) Inventors: Abhishek Jaiswal, Pune (IN); Bharti Soni, Pune (IN); Shrirang Shrikant Bhagwat, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/055,578

(22) Filed: Feb. 18, 2025

(65) Prior Publication Data

US 2026/0244641 A1 Aug. 20, 2026

(51) Int. Cl.
*G06F 16/00* (2019.01)
*G06F 16/27* (2019.01)

(52) U.S. Cl.
CPC .................................... *G06F 16/27* (2019.01)

(58) Field of Classification Search
CPC ...................................................... G06F 16/27
See application file for complete search history.

(56) References Cited

U.S. PATENT DOCUMENTS 8,775,549 B1 * 7/2014 Taylor ................. H04L 67/1097 709/217
8,838,849 B1 * 9/2014 Meiri .................... G06F 13/385 710/29
11,652,710 B1 * 5/2023 Ghosh ....................... G06F 9/50 709/226
11,811,867 B2 * 11/2023 Patel ....................... H04L 45/00
(Continued)

FOREIGN PATENT DOCUMENTS

CN 114760240 A 9/2022

OTHER PUBLICATIONS

Sousa et al.,“Towards Elastic Multi-Tenant Database Replication with Quality of Service”,2012,IEEE/ACM,pp. 1-8 (Year: 2012).*
(Continued)

*Primary Examiner* — Alexander Khong
(74) *Attorney, Agent, or Firm* — Stephen R. Yoder

(57) ABSTRACT

Replication links are selected from multiple asymmetric replication links for a specified tenant according to pre-defined service requirements to satisfy a wide variety of replication services. Link selection is based on applying predicted performance of the asymmetric replication links, which is derived from both static and dynamic performance parameters. A link rating model is trained on static parameter values and historic dynamic parameter values. Current dynamic parameter values and the static parameter values for a given replication link and input into the link rating model to generate predicted performance metrics and to
(Continued)

establish a performance rating for the asymmetric replication links. The rated replication links are mapped to various pre-defined tenant service requirements. In that way, a tenant may specify a service requirement, and the replication link engine identifies one or more rated replication links that will satisfy the service requirement.

20 Claims, 5 Drawing Sheets

(56) References Cited

U.S. PATENT DOCUMENTS

2011/0292792 A1* 12/2011 Zuo ........................ H04L 47/215 370/230
2020/0241755 A1* 7/2020 Bora ..................... G06F 16/275
2023/0231768 A1* 7/2023 Vysotsky .............. H04L 41/082 370/254
2023/0231802 A1* 7/2023 Vysotsky ............ H04L 12/4633 709/224
2024/0256399 A1* 8/2024 Raspudic ............ G06F 16/1844
2025/0028764 A1* 1/2025 Gwozdz .................. G06F 16/93
2025/0077364 A1* 3/2025 Huang ................ G06F 11/3034
2025/0245107 A1* 7/2025 Zhou ................... G06F 11/1469

OTHER PUBLICATIONS

Shen et al.,"Clustering Support and Replication Management for Scalable Network Services", 2003,IEEE,pp. 1-12 (Year: 2003).*
Kumar et al., "Taming Server Memory TCO with Multiple Software-Defined Compressed Tiers", Apr. 22, 2024, 15 pages.
Mega et al., "Dynamic cloud service topology adaption for minimizing resources while meeting performance goals", IBM, 2014, pp. 8 : 1-8 : 10.

* cited by examiner

MULTI-TENANT SELECTION OF ASYMMETRIC DATA REPLICATION LINKS IN DATA CENTERS

BACKGROUND

The present invention relates generally to the field of data storage, and more particularly to providing asymmetric data replication for data centers in multi-tenant environments.

Data replication is a widely used technique in the database and cloud storage areas where data residing on a physical/virtual server or cloud instance, a primary instance, is continuously replicated or copied to a secondary server or cloud instance, a standby instance. Data replication provides for achieving a high degree of system availability and scalability by distributing the incoming workloads to multiple replicas.

Multi-tenancy is an architecture where multiple tenants share the same physical instance of the application. Although tenants share physical resources, such as virtual machines or storage, each tenant uses its own logical instance of the application. Typically, application data is shared among the users within a tenant, but not with other tenants.

Differentiated services code point (DSCP) is a means of classifying and managing network traffic and of providing quality of service (QoS) in modern Layer 3 IP networks. DSCP uses the 6-bit differentiated services (DS) field in the IP header for the purpose of packet classification. QoS is the use of mechanisms or technologies that work on a network to control traffic and ensure the performance of critical applications with limited network capacity.

For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

SUMMARY

In one aspect of the present invention, a method, a computer program product, and a system includes: creating multiple quality buckets based on different tenant service requirements of multiple tenants; determining, for multiple replication links, individual performance ratings based on performance metrics corresponding to each replication link; assigning, by a machine learning model, a set of rated replication links to a first quality bucket based on the individual performance ratings; updating, by a prediction module, a first performance rating of a first replication link in the set of rated replication links to create an updated performance rating, the updating based on a predicted performance metric; reassigning, by an executor module, the first replication link to a second quality bucket based on the updated performance rating, the first quality bucket being assigned a new set of rated replication links not including the first replication link; responsive to the reassigning, switching, by the executor module, replication service from the first replication link for a first tenant requiring replication links in the first quality bucket; and automatically selecting, for the first tenant, a replacement replication link from the new set of rated replication links in the first bucket, the replacement replication link satisfying a tenant service requirement of the first tenant.

DETAILED DESCRIPTION

Figure 1:
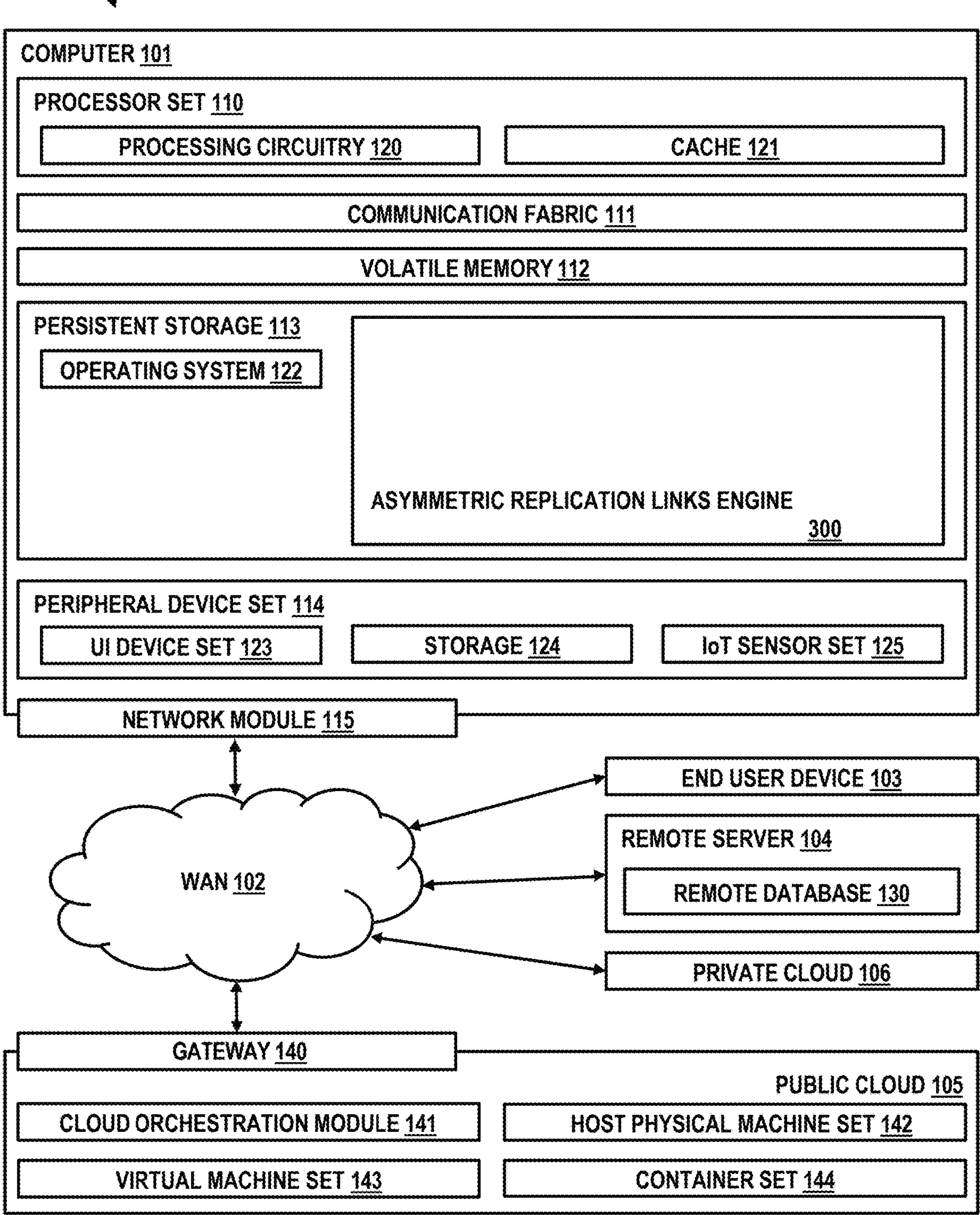
FIG. 1 is a schematic view of a first embodiment of a system according to the present invention.

Replication links are selected from multiple asymmetric replication links for a specified tenant according to pre-defined service requirements to satisfy a wide variety of replication services. Link selection is based on applying predicted performance of the asymmetric replication links, which is derived from both static and dynamic performance parameters. A link rating model is trained on static parameter values and historic dynamic parameter values. Current dynamic parameter values and the static parameter values for a given replication link and input into the link rating model to generate predicted performance metrics and to establish a performance rating for the asymmetric replication links. The rated replication links are mapped to various pre-defined tenant service requirements. In that way, a tenant may specify a service requirement, and the replication link engine identifies one or more rated replication links that will satisfy the service requirement. The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not storage in the form of one or more transitory signals, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as asymmetric replication links engine 300. In addition to block 300, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 300, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 300 in persistent storage 113.

COMMUNICATION FABRIC 111 represents the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 300 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as “images.” A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Asymmetric replication links engine 300 operates to select, or present a selection of, asymmetric replication links for a given tenant in a muti-tenant environment based on a set of pre-defined service requirements of the tenant. The selection process is based on both static and dynamic link attributes related to link performance. When a selection of links is provided to the tenant, the tenant selects from the given asymmetric replication links based on availability without impacting the required service level and corresponding recovery point objective and recovery time objective. The link selection engine further operates to rate the asymmetric replication links based on static and dynamic link attributes. Static link attributes include but are not limited to: (i) link bandwidth; (ii) round trip time (RTT); and (iii) specified packet drop percentage. Dynamic link parameters include but are not limited to: (i) link congestion; (ii) actual link packet drop percentage; (iii) packet jitter frequency; (iv) link glitches; (v) packet re-transmission; and (vi) out of order delivery. During operation of the replication links, the links engine evaluates real time attribute data to predict future performance and adjusts link rating, which may remove or add replication links from selection by a tenant based on the pre-defined service requirements of the tenant.

Some embodiments of the present invention recognize the following facts, potential problems and/or potential areas for improvement with respect to the current state of the art: (i) hybrid cloud, cross cloud, StaaS (storage as a service) are usually multi-tenancy enabled; (ii) multi-tenant environments have a variety of asymmetric replication links, also referred to as data lines or lease lines, to satisfy data replication needs in a cost effective manner; (iii) because there are different tenants in the multi-tenant environment using replication services over the cloud network, each tenant can have different recovery time objective (RTO) and/or recovery point objective (RPO) requirements; (iv) achieving performance goals for replication services is challenging for data replication service providers as they must balance the performance that they can deliver to all tenants while minimizing the operating costs; (v) where a plurality of asymmetric replication links are available, each link may have a different quality level or quality characteristic, such as round trip time (RTT), number of packet drops, number of packet jitters over time, and number of packet glitches over time; and/or (vi) invoking quality of service (QoS) and differentiated services code point (DSCP) in a multi-tenant cloud environment is inefficient because it is possible to have hundreds of applications and/or tenants in such an ecosystem such that individual SLA requirements cannot be truly satisfied using the QoS/DSCP approach.

Asymmetric data replication to cloud storage involves copying data to multiple locations in the cloud, but with a non-uniform distribution or different replication strategies based on the data type or its importance. Asymmetric data replication may send more copies of critical data to different cloud regions compared to less critical data, resulting in an uneven replication pattern across the cloud storage system. The term "cloud replication" refers to the process of replicating data from on-premises storage to the cloud, or from one cloud instance to another. Traditional data replication involves replicating data across different physical servers on a local network.

The term "data replication links" in cloud storage refers to the connections or pathways established between different cloud storage locations where copies of the same data are maintained. In that way, redundant copies are created to ensure high availability and data accessibility. Replication links facilitate the automatic transfer and synchronization of data across multiple regions or servers to maintain consistent data across all replicas.

The set of pre-defined service requirements of the tenant may be in the form of a service level agreement (SLA), which contains minimum levels of service that a storage provider is expected to provide. At a minimum, the service requirements of a tenant specify levels of responsiveness to I/O applications. Replication of data across multiple clouds is often established by service requirements in an interest to protect customer data. There can be different types of replication services such as synchronous, asynchronous, and background copy. Asymmetric replication links provide for the various types of services and levels of responsiveness required by diverse tenants using a cloud-enabled multi-tenant environment.

Database systems in cloud environments must handle a large number of replication services and/or tenants. Each service and/or tenant can have different pre-defined service requirements related to recovery time objectives (RTO) and/or recovery point objectives (RPO). To fulfil specific requirements of a given tenant, a set of pre-defined service requirements are defined and offered to each application and/or tenant. The metrics of Quality of Service (QoS) and/or Differentiated Services Code Point (DSCP) are often invoked to ensure compliance with a given service requirement, or SLA, for data replication services.

Both QoS and DSCP are limited to a maximum number of RTO/RPO requirement combinations. For example, it is possible to cater only up to seven kinds of traffic classes when QoS is used. Accordingly, there is a technical limit to how many numbers of different RTO/RPO combinations can be satisfied. Further, QoS and DSCP do not target the problem of replication link selection when multiple asymmetric replication links are available for a wide variety of replication services (IO applications) and/or tenants.

The most common approach to ensure that service requirements are met is to use Quality of Service (QoS) to ensure that a particular type of traffic gets priority over other types of traffic. This approach does not address selecting a favorable replication link, ignoring the fact that if a selected replication link has a high RTT and/or a high number of packet drops, no matter how well the QoS is designed, the RPO/RTO of the replication services will increase, likely failing to meet the promised service requirements. Still further, packet jitter and/or packet glitch in the selected replication link can degrade the quality of the replication service.

Initial ratings of the data replication links may be based entirely upon the available static parameter values. Alternatively, historic parameter values, whether static or dynamic, may influence the initial ratings. An exemplary operation of the initial ratings is a replication link having a relatively high bandwidth and a relatively low round trip time would be highly rated among available replication links.

In data center storage, the replication end-points, storage servers, replication data senders, and/or replication nodes track the number of dropped packets, the retransmission counter, and link jitter behavior. These replication link parameters are indicative of packet drops due to a replication link issue, network congestion, or out of order packet delivery via the link. Every such occurrence of reported packet drop will have an adverse effect on link rating. Further, when a packet is not dropped but only delayed due to link network congestion or out of order delivery, the replication end-points, storage servers, replication data senders, and/or replication nodes may update the run time RTT of the corresponding link, which facilitates link rating model prediction of when congestion will lead to a delay, or additional packet drops. Identified link jitter may adversely affect the rating of a given replication link.

According to some embodiments of the present invention, there are sub-groups of rated replication links within a given quality bucket. Each sub-group may represent a smaller bucket having similar logic as the quality bucket to facilitate scaling the storage solution. Accordingly, multiple scaled up tenants having a similar RPO and/or RTO with only a slight variation needed to ensure the SLA guarantees are true to the required RPO and/or RTO may select from replication links within the quality bucket, increasing the likelihood of link availability when needed.

Rated replication links may be moved between various quality buckets and/or sub-buckets based on a combination of the currently collected parameter metrics and the predicted link quality. The various replication links may be selected or de-selected for a specific tenant and/or replication service as the ratings of the replication links change.

Figure 2:
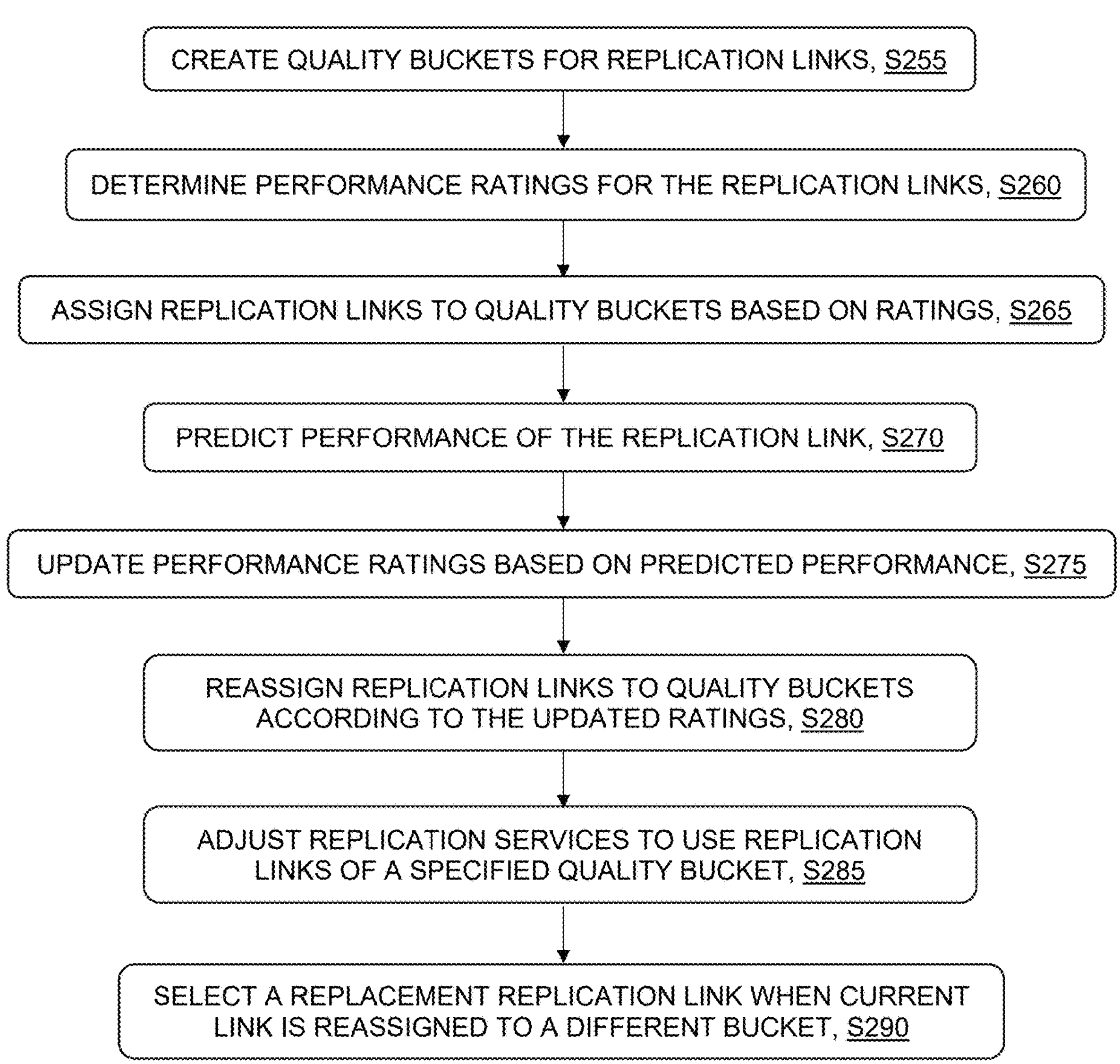
FIG. 2 is a flowchart showing a method performed, at least in part, by the first embodiment system.
Figure 3:
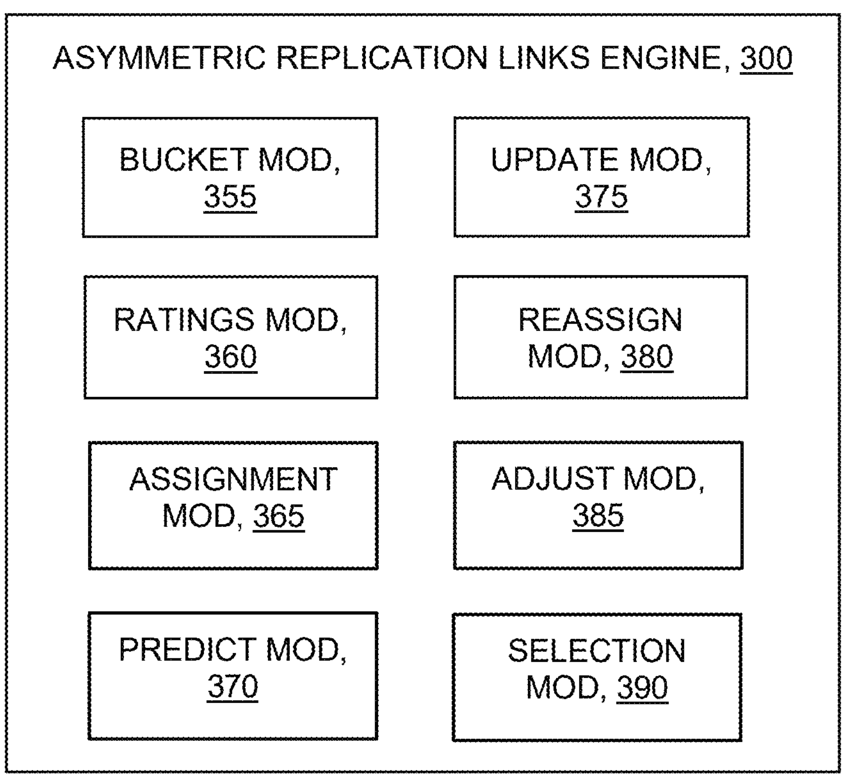
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where bucket module 355 creates quality buckets for replication links. In this example, quality buckets serve as containers for certain replication links, each bucket being aligned with a particular tenant service requirement or set of requirements, such as a service level agreement. Alternatively, the quality buckets are aligned with multiple related tenant service requirements such that they are partitioned into sub-buckets for individual service requirements. Quality buckets may be generated based on pre-defined sets of requirements or based on the storage needs of a specific set of tenants of a multi-tenant environment. According to some embodiments of the present invention, creating the quality buckets may be further based on the desired RPO and RTO for the tenants.

Processing proceeds to step S260, where ratings module 360 determines performance ratings for replication links. In this example, given a set of asymmetric replication links for a data center, performance ratings are assigned to each link. Ratings may be based entirely on static link parameters, such as link bandwidth, round trip time (RTT), and specified packet drop percentage. In this example, performance ratings are based on both static and dynamic parameters. Dynamic link parameters include, but are not limited to: ((i) link congestion; (ii) actual link packet drop percentage; (iii) packet jitter frequency; (iv) link glitches; (v) packet retransmission; and (vi) out of order delivery. In some embodiments of the present invention, replication links are asymmetric replication links providing storage for diverse tenants using a cloud-enabled multi-tenant environment. Further, according to some embodiments of the present invention, the asymmetric replication links provide for the various types of services and levels of responsiveness required by the diverse tenants. The various types of services including synchronous, asynchronous, and/or background copy services.

Processing proceeds to step S265, where assignment module 365 assigns replication links to quality buckets based on the individual performance ratings of the links. In this example, a set of rated replication links are assigned by a machine learning model to respective quality buckets based on the individual performance ratings. Alternatively, each rated replication link is assigned to various quality buckets, so long as the corresponding tenant service requirement may be satisfied according to the performance rating assigned to the replication link. That is, multiple quality buckets may include the same rated replication link.

Processing proceeds to step S270, where predict module 370 predicts performance of the replication links. The predict module receives performance data of operating replication links. The received performance data supports predicting future performance of the replication links. The predict module operates to predict future performance ratings of the various replication links. In some embodiments of the present invention, the predict module collects the performance data in real time, making performance predictions continuously. In this example, when predict module 370 predicts a future performance rating different than a current performance rating, the performance rating is updated. Alternatively, performance ratings are predicted periodically, such as every 24 hours. Replication link ratings may be reviewed on the same or different periodic basis.

Processing proceeds to step S275, where update module 375 updates performance ratings based on predicted performance of the replication links. As discussed herein, performance ratings vary due to dynamic performance parameters, which change over time. To maintain promised tenant service requirements, assigned replication links are reviewed for potential updates throughout its operation.

Processing proceeds to step S280, where reassign module 380 reassigns replication links according to the updated ratings. In this example, replication links are reassigned from a first quality bucket to a second quality bucket when a performance rating of a given link falls below or rises above the performance rating range associated with the first quality bucket. Alternatively, the reassign module operates to add a replication link to a new bucket when the updated rating meets the rating threshold or rating range of the new bucket.

Processing proceeds to step S285, where adjust module 385 adjusts replication services to use replication links of a specified quality bucket. In this example, the adjust module switches replication services from a down-rated replication link, which is no longer assigned to the quality bucket for a given tenant requirement, effectively halting service on the former replication link. Alternatively, the adjust module adjusts the bucket for which replication services are provided based on a change in tenant service requirements.

Processing ends at step S290, where selection module 390 selects a replacement replication link when the current link is reassigned to a different quality bucket. In this example, the replacement replication link is automatically selected for the affected tenant from a new set of rated replication links in the quality bucket corresponding to the appropriate tenant service requirements. The new set of rated links is established during the adjustments made in step S285, where some replication links are reassigned to different quality buckets due to a change in link performance rating.

Figure 4:
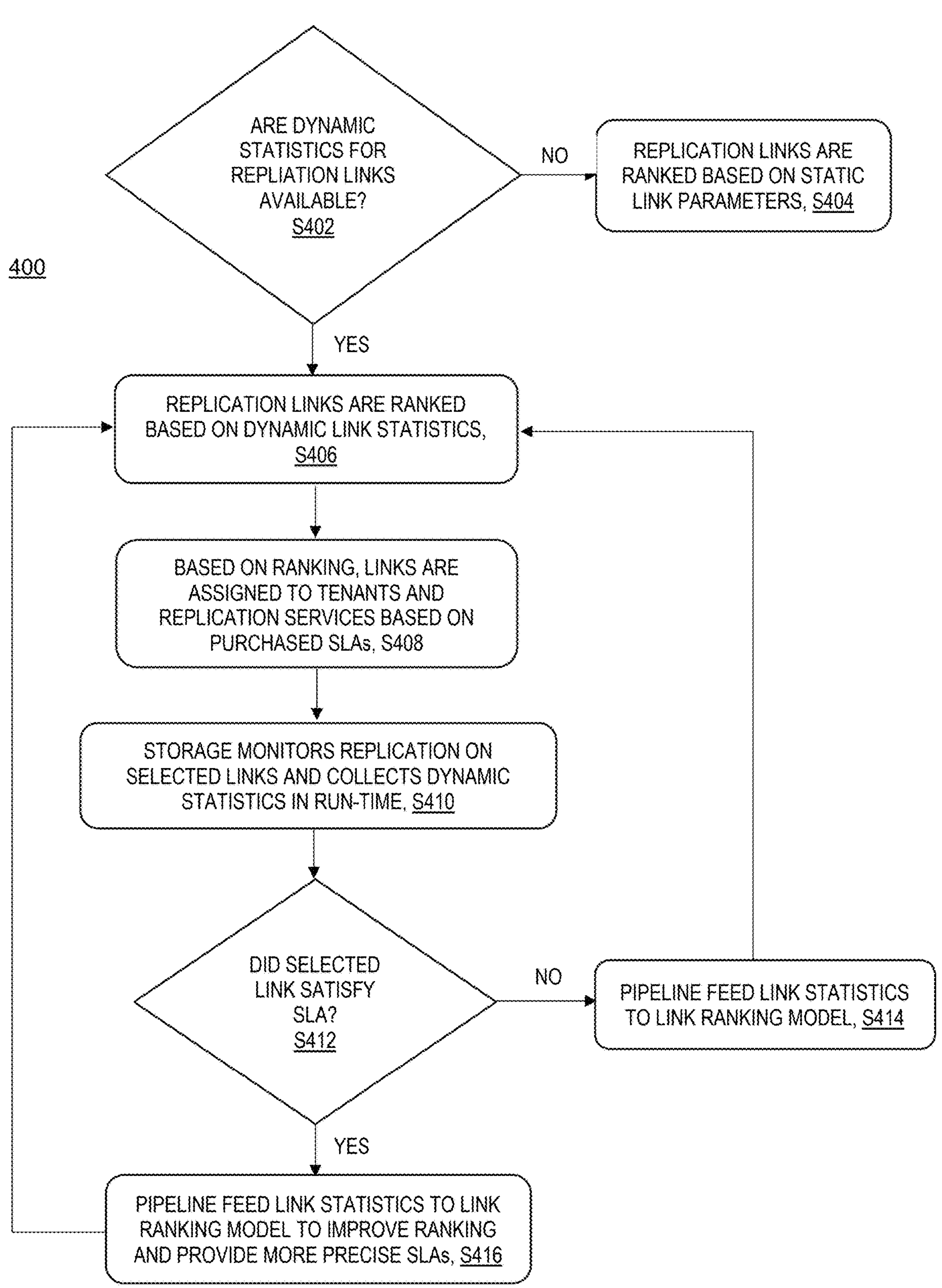
FIG. 4 is a flowchart showing a second embodiment of a method according to the present invention.
Figure 5:
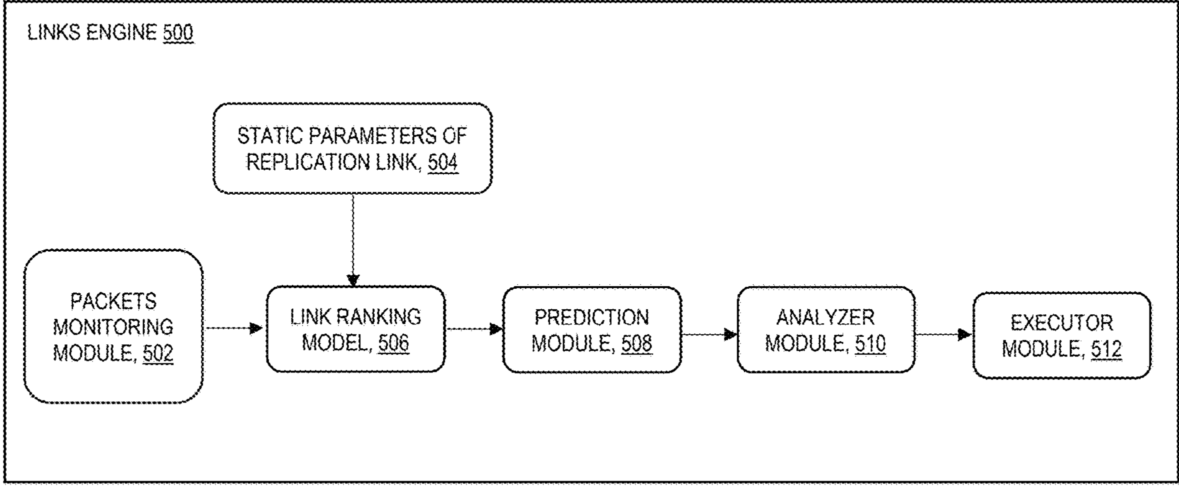
FIG. 5 is a schematic view of a second embodiments of a system according to the present invention.

Further embodiments of the present invention are presented in FIGS. 4 and 5, which are discussed in the paragraphs that follow.

FIG. 4 shows flowchart 400 depicting a second method according to an embodiment of the present invention.

Processing begins at step S402, where the system determines whether any dynamic statistics are available for one of the replication links. The dynamic statistics include replication link parameter values collected for dynamic link parameters. If no dynamic statistics are not available, processing proceeds down the "no" branch to step S404. If dynamic statistics are available, processing proceeds down the "yes" branch to step S406, discussed further below.

Processing proceeds down the "no" branch to step S404, where system ranks replication links based on static link parameters. In this example, static link parameters include link bandwidth, specified packet drop percentage, and round-trip time. It should be noted that there are other static parameters that may be considered for replication link ranking. Processing ends when there are no dynamic statistics available.

Following the "yes" branch, processing proceeds to step S406, where the system ranks replication links based on dynamic statistics in addition to available static statistics. Dynamic link statistics, or parameters, include, but are not limited to: ((i) link congestion; (ii) actual link packet drop percentage; (iii) packet jitter frequency; (iv) link glitches; (v) packet re-transmission; and (vi) out of order delivery.

Processing proceeds to step S408 where the system assigns replication links based on the link rankings. Links are assigned to tenants of a multi-tenant environment in connection with replication services according to service requirements specified by each tenant. A corresponding link ranking is mapped to each service requirement with the potential for more than one replication link being assigned to a given service requirement, indicating that the assigned links will satisfy the specified service requirement.

Processing proceeds to step S410, where the system monitors assigned replication links for replication activity. Monitoring includes collecting dynamic statistics during runtime, including retransmits, actual transfer delays, and link congestion.

Processing proceeds to step S412, where the system determines whether a selected replication link performed according to the specified service requirement. If the selected link did not perform as predicted and in accordance with the service requirement, processing follows the "no" branch to step S414. If the selected link does perform as expected and, perhaps outperforms expectations, processing follows the "yes" branch to step S416.

Following the "no" branch, processing proceeds to step S414, where the system returns the selected link statistics into a feedback loop to the link ranking model for refining predictions. Processing returns to step S406 where replication links are ranked using the refined model.

Following the "yes" branch, processing proceeds to step S416, where the system returns the selected link statistics in a feedback loop to the link ranking model to evaluate the ranking of the selected link to determine if the performance ranking of the link should be upgraded.

Referring now to FIG. 5, asymmetric replication links engine 500 includes: static parameters link 504; packet monitoring module (PMM) 502; link ranking model 506; prediction module 508; analyzer module 510; and executor module 512. The replication links engine may be implemented in a networked computer system, such as networked computer system 100 (FIG. 1), in a similar manner as shown for asymmetric replication links engine 300.

Packets monitoring module 502 monitors packets at regular intervals, for example every 5 minutes. The monitoring module sends collection data accumulated over the interval of time to an link ranking model for processing. Below are the various replication link parameters that may be captured via the packets monitoring module: (i) link congestion; (ii) actual link packet drop percentage; (iii) packet jitter frequency; (iv) link glitches; (v) packet re-transmission; and (vi) out of order delivery. Commercial packet monitoring products are available and may be caused to provide collected information to a designated link ranking model for processing according to embodiments of the present invention.

As discussed herein, initial ranking of replication links may be based on available static parameters of individual replication links. Additionally, historic values for certain dynamic link parameters may also be utilized for determining initial rankings of the replication links. Link ranking model 306 monitors link performance and records dynamic parameter values such as actual packet drop percentage, packet re-transmits, and the like. The dynamic statistics will be fed back to the link ranking model for performance predictions and updating of replication link rankings as warranted.

According to some embodiments of the present invention, a repeating cycle of collecting dynamic parameter values and applying predicted performance levels to the replication links for ranking updates provides for an accurate current link ranking. Replication links meeting the ranking criteria will be allocated to service requirement based buckets as the link ranking model continues learning. Further, historical performance data of a given link before a glitch or packet jitter is input to the link ranking model to support accurate predictions of future glitches and/or packet jitters. A feedback loop will ensure improved prediction accuracy for certain events.

Some embodiments of the present invention are directed to a continuously adjusted ranking of available replication links. The link ranking model receives a feedback loop as to whether or not a specified service requirement is met when operating with a selected replication link. When the link performance requirement of the service requirement is not met, the link ranking is lowered. When the link performance exceeds the requirement of the service requirement, the link ranking is raised. In this way, the link ranking model continues learning such that the performance predictions are more accurate and reliable.

Prediction module 508 ranks the various replication links according to the predicted parameter values of the trained regression model. Analyzer module 510 operates to analyze the ranked replication links for mapping a subset of links to each tenant in order to meet the agreed service requirement (s) for the tenants. If there is a change in the ranking of a previously mapped replication link, a new mapping may be generated and provided to the executor module.

In this example, data center storage providers initially provide a range of link ranks to service requirement mappings. Alternatively, the link-to-requirements mappings can be generated automatically by software based on current link rankings. There could be different policies for these mappings, for example, there could be ten different service requirement levels, each being mapped to individual link ranks, ten in total, in a one-to-one mapping. In a different scenario, five ranked links are sufficient to serve the ten different service requirement levels.

Executor module 512 switches the replication service according to new mappings provided by the analyzer module. For each of the tenants whose replication links have changed ranking/mapping, the replication service is halted on the former replication links and restarted on the currently mapped replication links. The frequency of updating link performance predictions can be set by the administrator, suggested by the link ranking model, or based on changing needs of related applications.

Some embodiments of the present invention are directed to a process for assigning replication links within a multi-tenant environment according to service requirements of the tenants. For example, the link rating model initially rates all available replication links based on parameter values for round trip time (RTT), link bandwidth, and packet drop frequency. The rated links are assigned to different service requirement-based buckets. Traffic from an individual tenant and replication service will be sent to selected replication links based on the subscribed service requirements of the individual tenant. As replication proceeds, the storage system monitors the traffic situation in real time and collects operational data including actual RTT, packet drops, glitches, completion time for individual I/O transactions, jitter, congestion, out of order packet delivery frequency, and the like. The storage system may also use historical I/O completion time before glitches/congestion/jitter to make predictions via a trained prediction model. The historical data and current operational data are pipelined to a link rating model for initial training, a feedback loop for continued improvement of predictions of replication link performance, and for updating link ratings. Based on current link ratings, it is possible for replication links to move across different service requirement-based buckets, which will be used to guarantee meeting of real time service requirements.

Some embodiments of the present invention ensure that a replication service provider is able to perform selection of an appropriate replication link from a plurality of available replication links because each link can exhibit a different RTT and number of packet drops. The plurality of replication links may vary in quality ranging from great quality links (low RTT and zero packet drops) to low quality links (high RTT and numerous packet drops).

Some embodiments of the present invention are directed to assuring the achievement of SLA requirements in replication services and applications for multi-tenants cloud environments with reduced total cost of ownership (TCO) by using asymmetric replication links for requirement-specific targets. Assurance is achieved by: (i) creating multiple buckets based on various service requirements; (ii) initially rating the asymmetric replication links based on static link parameters including link bandwidth, specified packet drop percentage, and link round trip time (RTT); (iii) adjusting initial rating based on certain dynamic link parameters including (i) link congestion; (ii) actual link packet drop percentage; (iii) packet jitter frequency; (iv) link glitches; (v) packet re-transmission; and (vi) out of order delivery; and (iv) selecting, for each tenant, one or more data replication links, based on a current performance rating and in view of the promised service requirements. The selection of data replication links may change as the performance ratings of the replication links change.

Some embodiments of the present invention are directed to rating asymmetric data replication links by a process using artificial intelligence and/or machine learning models that derive a rating based on received static and dynamic parameter values for the data replication links. The models are trained to provide the rating according to predicted relevant events. Rating of each active replication link can be updated upon detection of a variation to one of the dynamic parameter values that is predicted to change replication link performance.

Some embodiments of the present invention are directed to defining a service requirement agreement-based link buckets in which certain replication link performance levels are permitted. In establishing the link buckets, the desired RPO and RTO for tenants and/or replication services are considered.

Some embodiments of the present invention are directed to rating data replication links and putting the rated links into quality buckets according to their ratings. This rating can be done by feeding the following data into a learning pipeline to train a model. There are two primary types of data, the first type includes link parameters having static values, or static parameters. The second type includes link parameters having dynamic, or changing, values, which may be referred to as dynamic parameters. Examples of static parameters are round trip time (RTT), specified packet drop percentage, and bandwidth. Examples of dynamic parameters include: (i) link congestion; (ii) actual link packet drop percentage; (iii) packet jitter frequency; (iv) link glitches; (v) packet re-transmission; and (vi) out of order delivery. In some embodiments, for link packet drops, every occurrence of a packet drop, as noticed by the sender, affects the corresponding replication link rating.

Some embodiments of the present invention are directed toward predicting, via a trained model, when a given replication link is going to experience a network glitch. The prediction and observed confirmation of the glitch will operate to reinforce the trained model toward more accurate and precise predictions.

For any given replication link, the current, ongoing data collected during use as well as any available historical data may be fed into a regression model targeted to provide more accurate prediction of performance for the replication link. Based on the various predicted performance levels, replication links are rated pre-emptively to provide adequate replication link(s) to a specified multi-tenant application based on a defined RPO/RTO as directed by service requirements of the tenants.

Some embodiments of the present invention are directed toward rating of asymmetric replication links using artificial intelligence in multi-tenant cloud environments.

Some embodiments of the present invention may include one, or more, of the following features, characteristics and/or advantages: (i) identifies, or selects, a requirement-specific replication link that meets the service requirements of a specific tenant or group of tenants; (ii) rates replication links based on static and dynamic link attributes such as RTT, packet drops, packet retransmit in quanta of time; (iii) predicts asymmetric replication link performance; (iv) selects replication link(s) for specific tenant/service based on customer service requirements; and (iv) reduced data center TCO with use of asymmetric replication links without any impact on service agreements.

Some embodiments of the present invention are directed toward rating replication links based on some static link parameters including link bandwidth, specified packet drop percentage, or link RTT and some dynamic link parameters including, but not limited to: (i) link congestion; (ii) actual link packet drop percentage; (iii) packet jitter frequency; (iv)

link glitches; (v) packet re-transmission; and (vi) out of order delivery. After rating the set of replication links, for each tenant, one or more replication links are selected dynamically, based on the rating and in view of the tenant's service agreement.

Some embodiments of the present invention select appropriate replication links using a performance rating of a set of asymmetric data replication links according to pre-defined service-based requirements with emphasis on both static and dynamic link attributes. In that way, for a given service requirement, tenants may select from rated data replication links based on availability without impacting the required service level and corresponding recovery point objective and recovery time objective.

Some embodiments of the present invention are directed to rating of replication links based on static and dynamic link attributes including, but not limited to: (i) round trip time (RTT); (ii) packet drop percentage; (iii) packet jitter frequency; (iv) packet retransmit in quanta of time; (v) link glitches, (vi) link bandwidth; and (vii) out of order packet delivery.

Some embodiments of the present invention are directed to upgrading and downgrading data replication link mappings to service-based requirements based on the latest performance rating of a set of asymmetric data replication links. The performance rating of the links based on predicted link performance, the predictions output by a trained regression model.

Some embodiments of the present invention are directed to selecting a replication link for a given tenant based on a service requirement of the tenant. Alternatively, tenants are provided with a sub-set of replication links, each link designated as meeting a specified service requirement or set of service requirements. In that way, the tenant may select from among the sub-set of replication links based on availability without risking an undesirable service level.

Some embodiments of the present invention are directed to a computer-implemented method for determining a set of asymmetric replication links for use by a tenant in a multi-tenant environment to satisfy customer-specific service requirements, the method comprising: establishing a link rating model by providing training data based on static link performance parameters and historic dynamic link performance parameters; identifying static link parameter values for a set of asymmetric replication links; identifying dynamic link parameter values for the set of asymmetric replication links; determining, by the link rating model, link performance levels of the set of asymmetric replication links by predicting future parameter values based on the identified static parameter values and dynamic parameter values; rating each replication link by a corresponding performance level; mapping the rated replication links to corresponding tenant service requirements; and selecting, for a given tenant, a rated replication link for accessing data storage to meet a specified service requirement. The static performance parameters include, but are not limited to: (i) round trip time (RTT), (ii) link bandwidth, and (iii) packet drop percentage. The dynamic performance parameters include, but are not limited to: (i) link congestion; (ii) actual link packet drop percentage; (iii) packet jitter frequency; (iv) link glitches; (v) packet re-transmission; and (vi) out of order delivery.

Some embodiments of the present invention are directed to a computer-implemented method comprising: establishing a mapping of tenant service requirements to replication links in a multi-tenant environment, the replication links assigned respective performance ratings, the tenant service requirements corresponding to specified ranges of performance ratings; monitoring performance of the replication links by collecting real-time values of a set of dynamic parameters; predicting, by a link rating model, future dynamic parameter values based on the collected real-time parameter values; assigning a current performance level to a replication link, the current performance level being different than the respective performance level assigned to the replication link; and responsive to the current performance level being different than the respective performance level, automatically revising the mapping of tenant service requirements to replication links to create a revised mapping.

Some embodiments of the present invention are directed to a computer-implemented method comprising: identifying static parameter values for performance of a set of asymmetric replication links to data storage in a multi-tenant environment; identifying current parameter values for a set of dynamic parameters describing performance of the set of asymmetric replication links; assigning to each replication link a corresponding performance level based on performance according to the identified static parameter values and the current parameter values; determining ranges of performance levels suitable for meeting specified tenant service requirements; mapping tenant service requirements to replication links assigned performance levels corresponding to the ranges of performance levels; and predicting, by a link rating model, future dynamic parameter values based on the identified current parameter values.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:

creating multiple quality buckets based on different tenant service requirements of multiple tenants;

determining, for multiple replication links, individual performance ratings based on performance metrics corresponding to each replication link;

assigning, by a machine learning model, a plurality of replication links to a first quality bucket based on the individual performance ratings;

updating, by a prediction module, a first performance rating assigned to a first replication link in the plurality of replication links, the updating based on a change to one or more corresponding performance metrics of the first replication link;

reassigning, by an executor module, the first replication link to a second quality bucket based on the updated performance rating, the first quality bucket being assigned a second plurality of replication links not including the first replication link;

responsive to the reassigning, switching, by the executor module, replication service from the first replication link for a first tenant requiring replication links in the first quality bucket; and automatically selecting, for the first tenant, a replacement replication link from the second plurality of replication links in the first bucket, the replacement replication link satisfying a tenant service requirement of the first tenant.

2. The computer-implemented method of claim 1, wherein the change to one or more corresponding performance metrics is based on predicted dynamic parameter values, leaving static parameter values in place.

3. The computer-implemented method of claim 1, further comprising:

creating the quality buckets is further based on a desired recovery point objective (RPO) and a recovery time objective (RTO) for the tenants.

4. The computer-implemented method of claim 1, wherein assigning replication links to corresponding quality buckets includes:

selecting, from the multiple replication links, a set of replication links based on rating to meet a particular tenant service requirement.

5. The computer-implemented method of claim 1, wherein the performance metrics include static parameters and dynamic parameters on which the multiple replication links are rated.

6. The computer-implemented method of claim 1, wherein:

the multiple replication links are asymmetric replication links providing storage for diverse tenants using a cloud-enabled multi-tenant environment; and the asymmetric replication links provide for various types of services and levels of responsiveness required by the diverse tenants.

7. The computer-implemented method of claim 6, wherein the various types of services include: synchronous, asynchronous, and background copy.

8. The computer-implemented method of claim 1, wherein the change to the one or more corresponding performance metrics is based on measured metrics during operation.

9. The computer-implemented method of claim 1, wherein the individual performance ratings are maintained over time and used to select among the replication links for subsequent live data replication.

10. The computer-implemented method of claim 1, wherein each link of the plurality of replication links has an individual performance rating based on measured or predicted performance characteristics.

11. A computer program product comprising a computer-readable storage medium having a set of instructions stored therein which, when executed by a processor, causes the processor to perform a method comprising:

creating multiple quality buckets based on different tenant service requirements of multiple tenants;

determining, for multiple replication links, individual performance ratings based on performance metrics corresponding to each replication link;

assigning, by a machine learning model, a plurality of replication links to a first quality bucket based on the individual performance ratings;

updating, by a prediction module, a first performance rating assigned to a first replication link in the plurality of replication links, the updating based on a change to one or more corresponding performance metrics of the first replication link;

reassigning, by an executor module, the first replication link to a second quality bucket based on the updated performance rating, the first quality bucket being assigned a second plurality of replication links not including the first replication link;

responsive to the reassigning, switching, by the executor module, replication service from the first replication link for a first tenant requiring replication links in the first quality bucket; and automatically selecting, for the first tenant, a replacement replication link from the second plurality of replication links in the first bucket, the replacement replication link satisfying a tenant service requirement of the first tenant.

12. The computer program product of claim 11, wherein the change to one or more corresponding performance metrics is based on predicted dynamic parameter values, leaving static parameter values in place.

13. The computer program product of claim 11, further causing the processor to perform a method comprising:

creating the quality buckets is further based on a desired recovery point objective (RPO) and a recovery time objective (RTO) for the tenants.

14. The computer program product of claim 11, wherein assigning replication links to corresponding quality buckets includes:

selecting, from the multiple replication links, a set of replication links based on rating to meet a particular tenant service requirement.

15. The computer program product of claim 11, wherein the performance metrics include static parameters and dynamic parameters on which the multiple replication links are rated.

16. The computer program product of claim 11, wherein:

the multiple replication links are asymmetric replication links providing storage for diverse tenants using a cloud-enabled multi-tenant environment; and the asymmetric replication links provide for various types of services and levels of responsiveness required by the diverse tenants.

17. The computer program product of claim 16, wherein the various types of services include: synchronous, asynchronous, and background copy.

18. A computer system comprising:

a processor set; and a computer readable storage medium;

wherein:

the processor set is structured, located, connected, and/or programmed to run program instructions stored on the computer readable storage medium; and the program instructions which, when executed by the processor set, cause the processor set to perform a method comprising:

creating multiple quality buckets based on different tenant service requirements of multiple tenants;

determining, for multiple replication links, individual performance ratings based on performance metrics corresponding to each replication link;

assigning, by a machine learning model, a plurality of replication links to a first quality bucket based on the individual performance ratings;

updating, by a prediction module, a first performance rating assigned to a first replication link in the plurality of replication links, the updating based on a change to one or more corresponding performance metrics of the first replication link;

reassigning, by an executor module, the first replication link to a second quality bucket based on the updated performance rating, the first quality bucket being assigned a second plurality of replication links not including the first replication link;

responsive to the reassigning, switching, by the executor module, replication service from the first replication link for a first tenant requiring replication links in the first quality bucket; and automatically selecting, for the first tenant, a replacement replication link from the second plurality of replication links in the first bucket, the replacement replication link satisfying a tenant service requirement of the first tenant.

19. The computer system of claim 18, wherein the change to one or more corresponding performance metrics is based on predicted dynamic parameter values, leaving static parameter values in place.

20. The computer system of claim 18, further causing the processor to perform a method comprising:

creating the quality buckets is further based on a desired recovery point objective (RPO) and a recovery time objective (RTO) for the tenants.

* * * * *